United States Patent [19]
Nagai

[11] Patent Number: 5,675,235
[45] Date of Patent: Oct. 7, 1997

[54] CHARGING APPARATUS FOR CONTROLLING SUPPLEMENT OF ELECTRIC CURRENT TO A RECHARGEABLE BATTERY

[75] Inventor: Shinji Nagai, Kanagawa, Japan

[73] Assignee: Ricoh Company, Ltd., Tokyo, Japan

[21] Appl. No.: 605,922

[22] Filed: Feb. 23, 1996

[30] Foreign Application Priority Data

Feb. 28, 1995 [JP] Japan .................................. 7-039841

[51] Int. Cl.[6] .................................................. H01M 10/46
[52] U.S. Cl. .................................................. 320/22; 320/39
[58] Field of Search .................................. 320/5, 22, 23, 320/24, 30, 39, 40

[56] References Cited

U.S. PATENT DOCUMENTS

| | | | |
|---|---|---|---|
| 4,554,500 | 11/1985 | Sokira | 320/23 X |
| 4,767,977 | 8/1988 | Fasen et al. | 320/23 X |
| 4,952,861 | 8/1990 | Horn | 320/23 X |
| 5,043,650 | 8/1991 | Bhagwat et al. | 320/39 |
| 5,216,371 | 6/1993 | Nagai . | |
| 5,237,259 | 8/1993 | Sampei | 320/23 |

*Primary Examiner*—Edward Tso
*Attorney, Agent, or Firm*—Oblon, Spivak, McClelland, Maier & Neustadt, P.C.

[57] ABSTRACT

A charging apparatus for charging a rechargeable battery, such as a Lithium-ion type battery. The charging apparatus is provided with a first current stabilized unit and a second current stabilized unit for stabilizing two different levels of electric current. The first current stabilized unit provides a relatively large electric current for charging the battery package. The second current stabilized unit provides a relatively small electric current for charging the battery package. A switching unit is provided for switching a connection of the first and second current stabilized units to provide current to the rechargeable battery. A detection unit is provided for detecting an electric voltage at terminals of the rechargeable battery. The detection unit controls the switching unit so as to switch connection of the first and second current stabilized units to provide current to the rechargeable battery based on the detected voltage.

10 Claims, 2 Drawing Sheets

CHARGING APPARATUS FOR CONTROLLING SUPPLEMENT OF ELECTRIC CURRENT TO A RECHARGEABLE BATTERY

BACKGROUND OF THE INVENTION

1. Field of the Invention

This invention relates to a field of a charging apparatus for charging a rechargeable battery, such as a Lithium-ion type battery, which is used in a portable electric apparatus, and in particular to a charging apparatus for controlling a supplement of electric current to a rechargeable battery.

2. Discussion of the Background

According to the development of technology, portable electric apparatus, such as a notebook styled computer, are becoming more popular in many fields. As an example, a portable electric apparatus may be powered by an AC power in the operation of a desk top environment, and may be powered by a rechargeable battery in a mobile environment. According to a progression of processing ability of such portable electric apparatus, a consumption of electricity in such portable electric apparatus is increasing. Therefore, it has become wide spread to use a high capacity rechargeable battery device, such as a Lithium-ion type battery, for the portable electric apparatus.

When charging the rechargeable battery, the charging apparatus must be stabilized at an electric voltage for charging. The charging voltage is defined by a type of the rechargeable battery, such as Lithium-ion, NiMH, or NiCd. If the electric voltage is lower than a predetermined range, the charging capacity of the battery is decreased. Furthermore, if the electric voltage is higher than the predetermined range, the charging ability of the battery itself is seriously decreased because of the stress of the charging electric voltage in the battery device. As a result, the rechargeable battery may not be able to output the rated electric voltage from the terminals therein. Especially, the predetermined range of the Lithium-ion type battery is relatively narrow, and if such a Lithium-ion type battery is charged outside of its predetermined range, the maximum input electric current of the battery would be limited and the charging electric voltage must be accurately stabilized.

FIG. 3 shows a circuit diagram of a background charging apparatus for a Lithium-ion type battery. A rated voltage of a battery package 3 is, for example, 4.1 V. In this construction, first, a current stabilized unit 1 is provided for stabilizing an input electric current from an input power supply, and for regulating the highest level of charging current to about 1 A. Furthermore, a voltage stabilized unit 2 is provided for stabilizing a charging electric voltage to terminals of the rechargeable battery package 3, which accuracy is about 4.1±0.05 V.

FIG. 4 describes a charging characteristic of the charging apparatus shown in FIG. 3. As shown in FIG. 4, the terminal voltage of the rechargeable battery package 3 is gradually increased to 4.1 V from its exhausted level. In this status, the charging current is constantly provided at about 1 A. When the terminal voltage reaches about 4.1 V, the voltage stabilized unit 2 provides a constant voltage charging of about 4.1 V. In this status, the charging current would be gradually decreased and concentrated to 0 A.

In a case of using a NiMH battery or a NiCd battery, the completion of the charging could be detected by a rise of temperature of the battery itself. However, in a Lithium-ion type battery, it is difficult to detect the completion of the charging, because a Lithium-ion type battery does not incur a sufficient temperature change. Therefore, in the background charging apparatus as shown in FIG. 3 the completion of the charging is detected based on whether a predetermined period has passed in the constant voltage changing. However, there is some difficulty in detecting a full charge of the battery in the background method.

Additionally, in the background charging apparatus, a constant voltage charging system must be provided in the charging apparatus therein with high accuracy in all of a range of charging current. Therefore, the background charging apparatus requires a consideration of an influence of a loss of electric voltage caused by the connection of a print circuit board inside the charging apparatus. Furthermore, a loss of electric voltage caused by a connection resistance of the battery terminal itself must be considered.

According to a restriction of planning, the charging apparatus must be adjoined to the rechargeable battery package when charging the battery. The charging apparatus may be connected to the battery package with a Kelvin bridge connection so that the terminal voltage of the battery could be accurately monitored. Accordingly, the number of terminals of the battery package may be increased. However, this generates a restriction in planning of the rechargeable battery system. Furthermore, it would be a reason of increasing a cost of the rechargeable battery system. Due to increasing use of the rechargeable battery, it becomes more important to provide a low cost and efficient charging apparatus.

SUMMARY OF THE INVENTION

Accordingly, one object of this invention is to provide a novel and efficient charging apparatus for charging a rechargeable battery, such as a Lithium-ion type battery.

Another object of this invention is to control a charging status of a rechargeable battery without providing a voltage stabilized unit.

A further object of this invention is to provide a novel battery system which enables to charge efficiently, that is, which allows a flexibility of planning the battery system, and in which it is easy to detect a full charge on the battery.

The present invention achieves such objectives by a novel charging apparatus which provides electric power to a rechargeable battery, and which novel apparatus includes a first current stabilized unit and a second current stability unit. The first current stabilized unit provides a relatively large electric current for charging the battery package. The second current stabilized unit provides a relatively small electric current for charging the battery package. A switching unit is provided for switching a connection of the first and second current stabilized units to the rechargeable battery. A detection unit is provided for detecting an electric voltage of the terminal of the rechargeable battery. The detection unit is also provided for controlling the switching unit so as to switch the connection of the first and second current stabilized units to the rechargeable battery based on the detected voltage.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENT

The present invention may be implemented as part of a rechargeable battery system for a portable electric apparatus. In the following description, specific details are set forth in order to provide a thorough understanding of the present invention. It will be apparent, however, to one skilled in the art that the present invention may be practiced without such specific details. In other instances, well-known components of the rechargeable battery, for example a principle and a characteristic of a material for the rechargeable battery, have not been shown in detail in order to not unnecessarily obscure the present invention.

Figure 1:
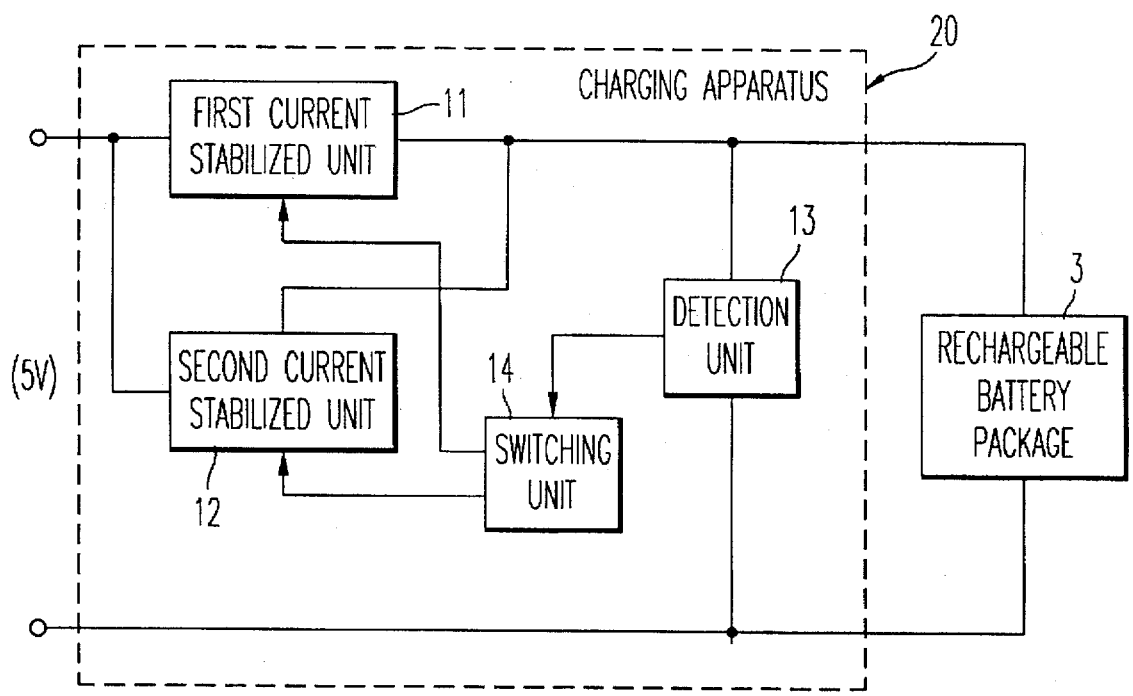
FIG. 1 is a circuit diagram of an implemented embodiment of the present invention.

Referring now to the drawings, wherein like reference numerals designate identical or corresponding parts throughout the several views, and more particularly to FIG. 1 thereof, FIG. 1 illustrates a circuit diagram of a charging apparatus as one implemented embodiment of the present invention.

In this embodiment of FIG. 1, an input electric voltage is provided from a power supply that is DC 5 V, for example. A rechargeable battery package 3, favorably a Lithium-ion type battery, is provided for the charging process in this embodiment. A rated voltage of the rechargeable battery 3 is 4.1 V, as an example. A first current stabilized unit 11 and a second current stabilized unit 12 are in a parallel connection in a charging apparatus 20. The first current stabilized unit 11 operates to stabilize an input electric current at a relatively large value, that is 0.7 A, as an example. The second current stabilized unit 12 operates to stabilize an input electric current at a relatively small value, that is 0.12 A, as an example.

When starting the charging process of a rechargeable battery, the first current stabilized unit 11 is connected to the rechargeable battery package 3 to provide a charging electricity to the rechargeable battery package 3, and a voltage level of the rechargeable battery package 3 may be exhausted. Therefore, the charging current is provided through the first current stabilized unit 11 to terminals of the battery package 3, so that high speed charging with a relatively large electric current is effectuated. After this, when a terminal voltage of the rechargeable battery package 3 reaches a rated voltage, a detection unit 13 detects the reaching of the rated electric voltage. The detection unit 13 could be formed by a general component of an IC (Integrated Circuit). At the result of the detection of the rated voltage, a switching unit 14 switches from the first current stabilized unit 11 to the second current stabilized unit 12 to output a current to the rechargeable battery package 3. Then, the charging current is provided for the rechargeable battery package 3 through the second current stabilized unit 12, with a relatively small electric current.

When the switching unit 14 has completed switching from the first current stabilized unit 11 to the second current stabilized unit 12, the terminal voltage would be slightly decreased near about, in the example provided, 4.0 V. Therefore, the rechargeable battery package 3 is charged continuously until the terminal voltage is reached at the rated voltage again by the charging current from the second current stabilized unit 12.

After this, when the voltage detection unit 13 detects the rated voltage for the second time, the charging apparatus 20 considers that the charging is completed. Then, a full charge of the rechargeable battery package 3 is detected in the present embodiment. Therefore, the voltage detection unit 13 then controls the switching unit 14 so that the second current stabilized unit 12 is disconnected and so that the charging current is stopped from being applied to the rechargeable battery package 3. Accordingly, the device in the present embodiment is able to detect a full charge of the rechargeable battery package 3 without consideration of the temperature change of the battery by the charging apparatus 20.

Figure 2:
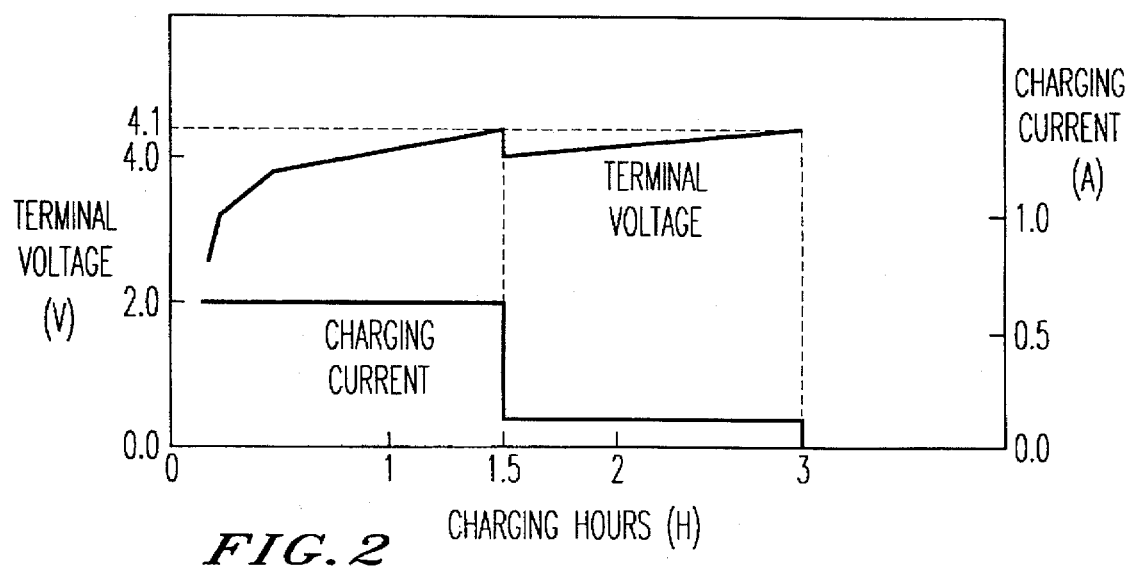
FIG. 2 describes a charging characteristic of the implemented embodiment of the present invention.
Figure 3:
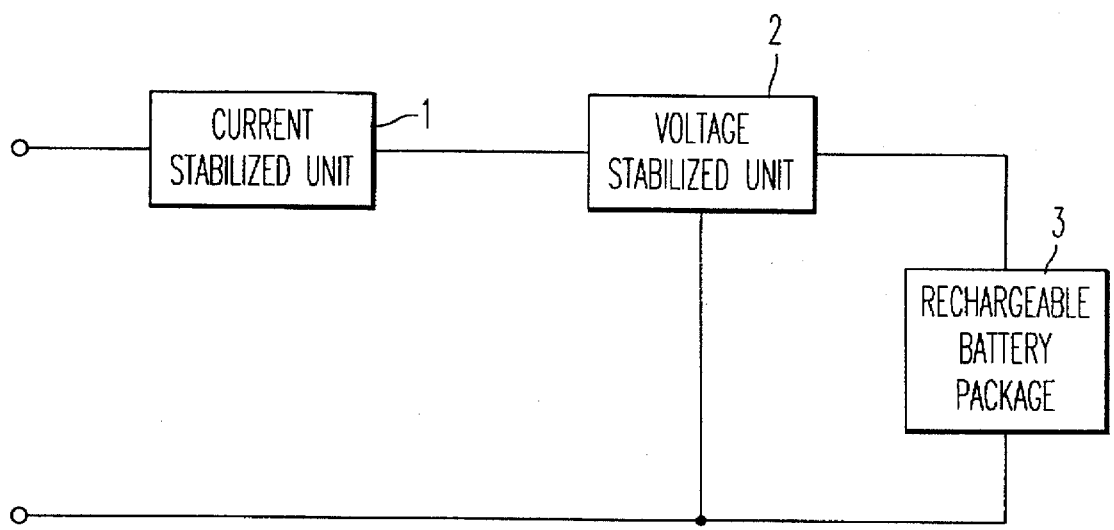
FIG. 3 is a circuit diagram of a background charging apparatus.
Figure 4:
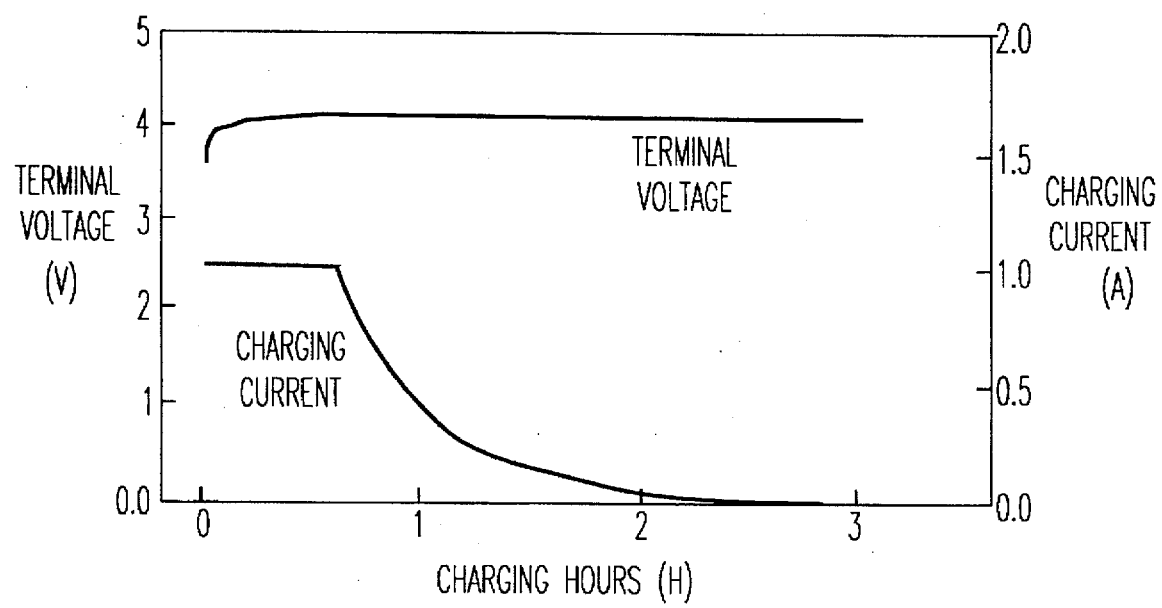
FIG. 4 describes a charging characteristic of the background charging apparatus.

Referring to FIG. 2, a charging characteristic of the charging apparatus 20 as shown in FIG. 1 is described. As shown in FIG. 2, the terminal voltage of the rechargeable battery package 3 is gradually increased to 4.1 V, that is a rated voltage of the rechargeable battery in the example provided, from its exhausted level. In this status, the charging current is initially constantly provided at about 0.7 A by the first current stabilized unit 11. When the terminal voltage is reached at about 4.1 V, for example, at one and a half hours passed from the starting of the charging process, the detection unit 13 detects the rated voltage. Then the switching unit 14 switches from the first current stabilized unit 11 to the second current stabilized unit 12 providing the electric current to the rechargeable battery package 3.

According to the switching process, the supplement of electric current is decreased and a terminal voltage is also decreased, because of the relatively small electric current provided by the second current stabilized unit 12 for charging the battery. In this status, the charging current is then constantly provided at about 0.12 A by the second current stabilized unit 12. After this, the small electric current is provided until the terminal voltage reaches the rated voltage again. When the detection unit 13 detects that the terminal voltage reaches the rated voltage for the second time, the switching unit 14 disconnects each of the current stabilized units 11 and 12 from providing an electric current to the rechargeable battery package 3, and this completes the charging process of the present embodiment.

In the present embodiment, a relatively large amount of electric current is provided for charging the rechargeable battery at the first stage of the charging process. This operates to accomplish about 70% or 80% of a full charge status of the battery. Then, a relatively small amount of electric current is provided for the rechargeable battery for accomplishing the full charge status of battery in the charging process. A total charging period would be decided by the amount of electric current from the two current stabilized units 11 and 12 in the present embodiment.

The present embodiment is able to get a full charge of the rechargeable battery, just for controlling supplement of electric current to the rechargeable battery. Thus, in the present invention, there is no need to provide an accurate and an expensive voltage stabilized unit. Furthermore, it is easy to detect the completion of charging the battery without detection of the temperature change of the battery itself. This means that effective and safe charging is accomplished by the present embodiment.

The detection unit 13 may be provided inside of the charging apparatus 20 and may monitor the terminal voltage. This means that there is a flexibility of the planning of the charging apparatus; because the planning of accuracy of the voltage stabilized unit, or the loss of electric voltage caused by the inside resistance or the connected resistance of the charging apparatus 20 and the rechargeable battery package 3, does not need to be considered.

Obviously, numerous modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A charging apparatus for providing electric power to a rechargeable battery, wherein said charging apparatus comprises:

a first current stabilized unit providing a first electric current to said rechargeable battery;

a second current stabilized unit providing a second electric current to said rechargeable battery, wherein said second electric current is less than said first electric current;

a switching unit switching a connection of said first and second current stabilized units to provide current to said rechargeable battery; and a detection unit detecting an electric voltage of a terminal of said rechargeable battery, and for controlling the switching unit so as to switch the connection of said first and second current stabilized units to provide current to said rechargeable battery from the first current stabilized unit until a first detection of a predetermined electric voltage of the terminal, then to switch to connection of the second current stabilized unit to provide current to said rechargeable battery unit until a second detection of the predetermined electric voltage of the terminal, and then to disconnect the first and second current stabilized units.

2. A charging apparatus as recited in claim 1, wherein said rechargeable battery is a Lithium-ion battery.

3. A charging apparatus as recited in claim 1, wherein said detection unit detects a rated electric voltage of said rechargeable battery.

4. A charging apparatus as recited in claim 1, wherein said predetermined electric voltage is a rated voltage of said rechargeable battery.

5. A battery system for an electric device using a rechargeable battery comprising:

a rechargeable battery package including at least one rechargeable battery device;

a first current stabilized unit providing a first electric current to said rechargeable battery device;

a second current stabilized unit providing a second electric current to said rechargeable battery device, wherein said second electric current is less than said first electric current;

a switching unit switching a connection of said first and second current stabilized units to provide current to said rechargeable battery;

a detection unit, operatively connected to said switching unit, detecting an electric voltage at a terminal of said rechargeable battery package, and controlling said switching unit based on a result of the detected voltage to supply a current to said rechargeable battery package from the first current stabilized unit until a first detection of a predetermined electric voltage at the terminal, then to switch to connection of the second current stabilized unit to provide current to said rechargeable battery package until a second detection of the predetermined electric voltage at the terminal, and then to disconnect the first and second current stabilized units.

6. A charging apparatus for providing electric power to a rechargeable battery, wherein said charging apparatus comprises:

a first current stabilized unit providing a first electric current to said rechargeable battery;

a second current stabilized unit providing a second electric current to said rechargeable battery, wherein said second electric current is less than said first electric current;

a switching unit switching a connection of said first and second current stabilized units to provide current to said rechargeable battery; and a detection means for detecting an electric voltage of a terminal of said rechargeable battery, and for controlling the switching means so as to switch the connection of said first and second current stabilized means to provide current to said rechargeable battery from the first current stabilized unit until a first detection of a predetermined electric voltage of the terminal, then to switch to connection of the second current stabilized unit to provide current to said rechargeable battery until a second detection of the predetermined electric voltage of the terminal, and then to disconnect the first and second current stabilized units.

7. A charging apparatus as recited in claim 6, wherein said rechargeable battery is a Lithium-ion battery.

8. A charging apparatus as recited in claim 6, wherein said detection means detects a rated electric voltage of said rechargeable battery.

9. A charging apparatus as recited in claim 6, wherein said predetermined electric voltage is a rated voltage of said rechargeable battery.

10. A charging apparatus as recited in claim 6, wherein said charging apparatus detects a completion of charging when said detection means detects a predetermined electric voltage of said rechargeable battery is reached for a second time.

* * * * *